Patented Sept. 14, 1954

2,689,009

UNITED STATES PATENT OFFICE 2,689,009

ACIDIZING WELLS

Harold W. Brainerd, Jr., Clarence R. Fast, and George C. Howard, Tulsa, Okla., assignors to Stanolind Oil and Gas Company, Tulsa, Okla., a corporation of Delaware No Drawing. Application April 14, 1951, Serial No. 221,136

20 Claims. (Cl. 166—25)

This invention pertains to a well-treating solution and to an improved method of treating wells to increase their productivity.

In the art of completing wells or working over old wells to increase the output, acid is injected into the producing zones to increase the permeability of the formation around the well. Since acid reacts very rapidly with calcareous formations, it appears that the action of the acid is very close to the well. Accordingly, the effect of acidizing a well is generally to increase output, but the increase appears to be much less than would be possible if the acid could be made to react into long channels deep into the formations.

It has been proposed that strong mineral acids which are used to acidize formations penetrated by a well be incorporated as the discontinuous phase in an acid-oil emulsion. By thus shielding the acid, it is prevented from contacting the well tubing and the calcareous formations as the acid is injected into a well. Corrosion of the tubing is avoided, and the reaction of the acid on the formation is retarded. Certain oils are known to emulsify with acids; and, in some cases, the emulsion may be produced by incorporating in the oil or the acid certain emulsifying agents. This proposal has not been used, since, in practice, it has been found that the emulsifying agents proposed are either too stable or too unstable. That is, if the emulsion is too stable, the emulsion may not be easily broken down in the well or in the formation; and, if injected into a formation, as by the application of a high pressure, the emulsion cannot be displaced from the pores of the formation by the relatively small available natural driving force. The formation would thus be plugged if such stable emulsions were forced into the capillaries surrounding a well. If the emulsion is unstable, it is of no value for the intended purpose. In either case, however, the action of the acid is close to the well, and long flow channels into the formation are not produced.

It is an object of this invention to provide an improved well-treating solution. It is another object of this invention to provide a well-treating solution comprising an emulsion of an acid and an oily vehicle which can be injected into a formation at high pressure to fracture the formation and which subsequently can be removed from the formation without plugging the pores thereof. A still further object of this invention is to provide an improved process for increasing the permeability of calcareous formations which produce oil or gas or other valuable fluids.

This invention, in brief, comprises a well-treating solution in which acid is emulsified in an oil dispersion of Batu gum and an improved process in which the viscous emulsion is injected into a formation at a pressure great enough to fracture the formation.

Batu gum is a natural resin related to the Damar natural resins and is a secretion or exudation of the Shorea tree of the East Indies. It is soluble in aryl or coal tar hydrocarbons and in hydrogenated aliphatic petroleum solvents but is generally only very slightly soluble in crude petroleum or refined paraffinic petroleum hydrocarbons. It is, however, compatible with and can be dispersed in paraffinic hydrocarbons, both crude and refined. It is available commercially as bold scraped, unscraped, nubs and chips, and as dust.

The acid phase of the emulsion may be any acid, such as hydrochloric, nitric, or hydrofluoric, which reacts with the formation and produces a water-soluble salt. The most important well acid is hydrochloric acid in the concentration range from about 5 to about 20° Bé. The higher concentrations are preferred in view of the increased reaction rate and the decrease in breakdown time for the emulsion. The vehicle in which the acid of our treating solution is emulsified may consist of non-aqueous liquids, such as liquid petroleum hydrocarbons, e. g., crude oil, kerosene, diesel fuel, or other light liquid hydrocarbons of this class, but we prefer kerosene, since it is practically universally available, the composition is relatively uniform, and it is not considered hazardous to handle. While any of the commercial grades of Batu gum will emulsify oil and acid in accordance with this invention, bold scraped and nubs and chips are preferred. This gum is, preferably, ground to pass through a 100-mesh U. S. standard sieve or finer. Larger particles may be incorporated. We have found, for example, that, with Batu nubs and chips, the viscosity of the emulsion varies as a function of the particle size. As an example of this effect of particle size, emulsions having the same proportions of constituents—namely, 100 parts hydrochloric acid, 12 parts kerosene, and 2 parts Batu nubs and chips by weight—were prepared with different sizes of gum particles. The viscosity after 30 minutes as measured on the Halliburton thickening time tester which is described in A. P. I. RP 10 B, Recommended Practice for Testing Oil Well Cements, third edition, increased as the particle size of the gum decreased, as indicated in the following table:

*Table*

| Particle Size (Mesh) | Viscosity (Poises) |
|---|---|
| −40 | 25 |
| −100 | 32 |
| −200 | 34 |
| −325 | 37 |

Since, as pointed out hereinafter, a high initial viscosity for the emulsion is desirable, it can be seen that particles of 100 mesh or smaller are substantially superior to larger particles.

The emulsion is prepared by first mixing between about 5 and about 30 parts of this finely divided gum per 100 parts by weight of liquid hydrocarbon. They are mixed—preferably, at high shear rates—until the gum is evenly dispersed in the hydrocarbon. The ratio may be varied substantially, particularly on the high end, since pumpability is the limiting factor, and very viscous emulsions can be pumped. The amount of hydrocarbon used depends upon the amount of acid used, the hydrocarbon-acid ratio being in the range of about 6 to about 24 parts hydrocarbon by weight per 100 parts acid. It has been found that these proportions may be varied substantially and still obtain a desirable emulsion; but, when the ratio of hydrocarbon to acid is reduced materially below the preferred range, there is often excess acid which separates from the emulsion on standing. Also, when the ratio of hydrocarbon to acid is above the preferred range, excess hydrocarbon separates from the emulsion on standing. In general, it can be said, however, other things, including agitation, being equal, that the viscosity of the emulsion increases as the concentration of the kerosene decreases, until a point is reached at which excess acid separates from the emulsion on standing. The preferred composition range is, therefore, on a weight basis, between about 1 and 5 parts—typically 2 parts—gum and between about 6 and about 24 parts—typically 10 parts—liquid hydrocarbon per 100 parts acid.

The oily vehicle containing the dispersed finely divided gum may be emulsified with the acid by any number of means. It has been found, however, that, by mixing the two in any of a number of well-known homogenizers, the viscosity of the emulsion is higher than where they are mixed at lower shear rates. For example, the acid and the oily vehicle containing the Batu may be mixed by running them together through an ordinary pump, and viscosities as high as 50 poises may be obtained; where the same concentration of constituents is used and the rate of shear is increased by using a jet-type homogenizer, the viscosity of the emulsion may be increased by two or more times. Accordingly, it can be seen that a viscosity in the range of between about 25 and about 50 poises, which is the preferred range, may be obtained by varying the ratio of the constituents and by the method of mixing. In general, less than about 2 per cent Batu based on the weight of the acid is to be preferred where the rate of mixing and/or length of mixing time can be arranged, so that a viscosity in the preferred range is obtained. Higher concentrations of the emulsifying agent may be used at increased breakdown time where mixing facilities do not provide adequate emulsion viscosity. Where the emulsifier does not provide a shear rate high enough to form a sufficiently viscous emulsion, it has been found that increased viscosity can be obtained by increasing the mixing time at a moderately high shear rate. In one case, for example, where 2 per cent by weight Batu nubs and chips through 100-mesh U. S. standard sieve and 9.6 per cent by weight kerosene were incorporated in 13° Bé. hydrochloric acid, the viscosity using a propeller-type mixer running at 1750 R. P. M. was found to increase from about 33 poises after 5 minutes to about 38 poises after mixing the emulsion 15 minutes.

This emulsion is pumped or flowed into the well, preferably into a confined zone at the bottom of the well, through tubing or the like. Another fluid—such as water, oil, or acid—is then injected into the tubing following the emulsion. If pumping or injection of the emulsion or the fluid following the emulsion is continued after the confined zone in the well becomes filled with the viscous emulsion, the hydraulic pressure on the fluid rises until the strength of the formation is overcome and the formation is fractured. The hydraulic pressure in the confined zone necessary to produce a fracture has been found to vary in wells 2,000 feet or more in depth between about 0.7 and about 1 pound per square inch per foot of well depth. This pressure—i. e., the pressure required to fracture a formation or the pressure beyond which an increase in rate of injection will not materially increase the pressure—is hereinafter referred to as the formation-breakdown pressure. It is generally recognized by an observation of the pressure in the tubing or the pressure on the pumps, or it may be measured with a bottom-hole pressure gage. After the confined zone in the well becomes filled with emulsion, the pressure rises sharply—assuming a substantial volume, e. g., two or more barrels per minute, is being injected—until the pressure rise ceases to be proportional to the volume of fluid injected into the well. In fact, in many cases, after the confined zone has been filled with the emulsion and the formation-breakdown pressure has been reached, the pressure may decrease sharply, indicating that the emulsion is flowing into a fracture in the formation. In some cases, namely, about 25 per cent of the jobs done to date, there is no material breakdown in pressure when the formation fractures, since the tensile strength of the rock is so low that, when the pressure in the confined zone is sufficient to lift the effective overburden at that point, the formation parts, and the emulsion enters the formation and extends the fracture to great distances from the well. Obviously, after the emulsion commences to enter and extend the fracture, the friction in the fracture being small, an increase in the pump rate will not materially increase the pressure at the elevation of the fracture. A formation fracture and the formation-breakdown pressure are therefore readily recognized. Another means of indicating a formation fracture is to note the slope of the pressure vs. volume curve at the surface. If, after the confined zone of the well is filled, the emulsion is pumped slowly into the well, it will leak away into the permeable formation at a rate depending upon the differential pressure between the well and the formation; and the differential pressure will vary directly as the rate of injection. However, after the formation fractures or when the formation-breakdown pressure has been reached, the ratio of volume of fluid to pressure increases. Accordingly, the slope of the pressure vs. pump rate curve changes when the formation fractures or when the formation-breakdown pressure has been reached.

After the formation fractures, the emulsion enters the fracture which may be extended a substantial distance into the formation by continued pumping of the emulsion or the fluid following the emulsion. Any amount of emulsion may be injected into the fracture, depending upon the extent of fracture desired. In a typical treatment, between about 500 and 2,000 gallons of emulsion are injected into the fracture. When all of the emulsion has been injected into the fracture, the fluid following—which, as indicated above, is preferably unemulsified or plain strong mineral acid—may also be injected into the fracture.

As is well known, when strong mineral acids are reacted with well formations, water-soluble salts are produced. While the emulsions and the emulsifying gum are not broken or affected by the acid per se, we have found that, when the emulsion contacts a calcareous formation and the water-soluble salt is produced, the emulsion is broken. Apparently this salt, some surface effect, a catalytic effect of the calcareous formation, or, perhaps, the partial reaction of the acid with the formation breaks the emulsion, freeing the acid for reaction with the formation.

The plain acid following the emulsion also contacts the formation surrounding the fracture, and the excess of reaction product or the additional reaction itself appears to insure breakdown of any emulsion which might not otherwise break down. The amount of plain acid following the emulsified acid is not believed to be critical. In fact, none is actually required; but, by emulsifying only part of the acid, there is some economic advantage plus the assurance that the emulsion breaks more rapidly. Equal volumes of emulsified and plain acid produce very desirable results. After the plain acid is injected into the formation, the well may be closed in for a short time to allow the emulsion to break and the acid to react with the formation. In general, the time delay is greater than the delay where plain acid is injected into a formation, since the reaction rate of the emulsion appears to be retarded by the emulsion. However, in about 24 hours, the viscosity of a kerosene-hydrochloric acid emulsion of the preferred composition in the presence of excess limestone and at a bottom-hole temperature of 120° F. and pressure of 1500 p. s. i. has been found to be reduced from about 50 poises to about 5 centipoises, the viscosity of the reaction product. This reaction product may then be removed from the well by flowing the well, by pumping, or the like.

As an example of the operation of this invention, an emulsion having the following composition was made up and used to treat a well in the Fullerton Field, Andrews County, Texas: 260 pounds of Batu nubs and chips ground to pass through 100-mesh U. S. standard sieve were dispersed in 200 gallons of kerosene by circulating the kerosene in a tank. This kerosene was then emulsified with 1500 gallons of 20 per cent hydrochloric acid (13.25° Bé.) by circulating the two solutions through a tank with a duplex, reciprocating pump for about 60 minutes. At that time, the viscosity of the emulsion was about 30 poises. The emulsion was then injected at the rate of about 110 G. P. M. into a confined zone between 6706 feet and 6820 feet in the Clearfork, a dolomitic formation. This amount of emulsion was insufficient to fill the confined zone of the well and the two-inch tubing; and, therefore, the emulsion was followed with plain acid. The pressure built up to a maximum of about 4,300 p. s. i. surface pressure before the formation broke down and took the emulsion through a fracture. The emulsion was then injected into the fracture at about 3,000 p. s. i. It was followed in sequence by 3,500 gallons of 15 per cent plain hydrochloric acid (10.12° Bé.) and 40 barrels of crude oil.

Before this treatment and after being acidized with the same amount of acid solution, the well produced 14 barrels of oil per day with no water. Two months after treatment and long after the "load" oil had been recovered, the well produced 46 barrels of oil per day with no water. The increase in production following this treatment indicated that, even though the well had previously been acidized with plain acid, new flow channels were produced. This indicated then that a permeable fracture was created in the formation which increased the drainage area of the well and the permeability adjacent the well. Many other such treatments in wells in different formations, both limestone and dolomitic, have yielded similar improvements.

While this invention has been described with reference to a preferred composition and a preferred procedure, it will be apparent that various modifications can be made without departing from the spirit of the invention. For example, it is sometimes desirable to suspend in the emulsion a propping agent, such as sand, having a particle size in the range between about 10- and about 40-mesh U. S. standard sieve, so that, after the fracture is created and the emulsion is removed therefrom, the fracture will be held open by these props. Other modifications will be apparent to those skilled in the art. The invention should therefore not be construed to be limited by the above examples but should be limited only by the scope of the appended claims.

We claim:

1. A composition of matter comprising an emulsion of a strong mineral acid and an oily vehicle containing Batu gum.

2. A well-treating emulsion comprising finely divided Batu gum, an oily vehicle, and an acid capable of forming a water-soluble salt with earth formations.

3. A well-treating fluid comprising finely divided Batu gum dispersed in an oily vehicle and an acid capable of forming a water-soluble salt with earth formations, said acid being emulsified as the discontinuous phase within said oily vehicle.

4. A well treating fluid comprising an emulsion of hydrochloric acid and a dispersion of a finely divided Batu gum in a compatible oily vehicle, said acid being the discontinuous phase, and said oily vehicle being the continuous phase in said emulsion.

5. A well-treating fluid comprising an emulsion of hydrochloric acid and between about 6 and about 24 parts by weight of a liquid hydrocarbon per 100 parts of said acid, said hydrocarbon containing sufficient finely divided Batu gum to emulsify substantially completely said acid and said hydrocarbon.

6. A well-treating fluid comprising an emulsion of hydrochloric acid and between about 6 and about 24 parts by weight of a liquid hydrocarbon and between about 1 and about 5 parts by weight of finely divided Batu gum per 100 parts of said acid.

7. A well-treating fluid comprising an emulsion of hydrochloric acid and between about 6 and about 24 parts by weight of a liquid hydrocarbon per 100 parts of said acid, said hydrocarbon containing between about 5 and about 30 parts of finely divided Batu gum per 100 parts of said liquid hydrocarbon.

8. A method of increasing the productivity of a calcareous formation penetrated by a well comprising disposing adjacent said formation an emulsion of an acid capable of forming a water-soluble salt with said formation and a dispersion of finely divided Batu gum in a compatible oily vehicle, applying a hydraulic pressure as great as the formation-breakdown pressure to said emulsion to fracture said formation, and injecting said emulsion into said fracture.

9. A method of increasing the productivity of a calcareous formation penetrated by a well comprising isolating a section of said well opposite said formation from the remainder of said well, disposing in said section an emulsion of an acid capable of forming a water-soluble salt with said formation and a dispersion of finely divided Batu gum in a compatible, oily vehicle, applying a hydraulic pressure as great as the formation-breakdown pressure to said emulsion to fracture said formation, and injecting said emulsion into said fracture.

10. A method of increasing the productivity of a calcareous formation penetrated by a well comprising isolating a section of said well opposite said formation from the remainder of said well, disposing in said section an emulsion of hydrochloric acid and a liquid hydrocarbon containing sufficient finely divided Batu gum to emulsify substantially completely said acid and said hydrocarbon, applying a hydraulic pressure as great as the formation-breakdown pressure to said emulsion to fracture said formation, and injecting said emulsion into said fracture.

11. A method of increasing the productivity of a calcareous formation penetrated by a well comprising isolating a section of said well opposite said formation from the remainder of said well, disposing in said section an emulsion of hydrochloric acid solution, between about 6 and about 24 parts by weight of a liquid hydrocarbon and between about 1 and about 5 parts by weight of finely divided Batu gum per 100 parts of said acid solution, applying a hydraulic pressure as great as the formation breakdown pressure to said emulsion to fracture said formation, and injecting said emulsion into the fracture.

12. A method of increasing the productivity of a calcareous formation penetrated by a well comprising isolating a section of said well opposite said formation from the remainder of said well, disposing in said section an emulsion of hydrochloric acid solution, between about 6 and about 24 parts by weight of a liquid hydrocarbon, and between about 1 and about 5 parts by weight of finely divided Batu gum per 100 parts of said acid solution, applying a hydraulic pressure as great as the formation-breakdown pressure to said emulsion to fracture said formation, injecting said emulsion into said fracture causing said acid to react with said calcareous formation and break said emulsion whereby the permeability of said formation is increased a substantial distance from said well and producing said well to remove the spent hydrochloric acid solution and liquid hydrocarbon from said well.

13. A method of increasing the productivity of a calcareous formation penetrated by a well comprising isolating a section of said well opposite said formation from the remainder of said well, disposing in said section an emulsion of hydrochloric acid solution, between about 6 and about 24 parts by weight of a liquid hydrocarbon, and between about 1 and about 5 parts by weight of finely divided Batu gum per 100 parts of said acid solution, applying to said emulsion a hydraulic pressure in the range between about 0.7 and about 1 pound per foot of well depth to fracture said formation, displacing said emulsion into the fracture by injecting a plain acid solution into said well following said emulsion, and displacing said plain acid solution from said well by following said plain acid solution with another fluid whereby said emulsion is injected into said formation a substantial distance from said well, and said emulsion is broken so that the permeability of the flow channels to said well is increased a substantial distance from said well.

14. A method of increasing the productivity of a calcareous formation penetrated by a well comprising isolating a section of said well opposite said formation from the remainder of said well, disposing in said section an emulsion of about 100 parts by weight of about 13° Bé. hydrochloric acid, about 10 parts by weight of kerosene, and about 2 parts by weight of finely divided Batu gum, applying to said emulsion in said section a hydraulic pressure in the range between about 0.7 and about 1 pound per foot of well depth to fracture said formation, and displacing said emulsion into the fracture.

15. The method of increasing the productivity of a calcareous formation penetrated by a well which method comprises emulsifying a strong mineral acid in an oily vehicle containing an effective amount of Batu gum to form a viscous emulsion initially having a viscosity in the range of about 25 to about 50 poises and being capable of becoming broken by contact with said calcareous formation, introducing said viscous emulsion into a confined zone of said well adjacent said formation, applying a hydrostatic pressure to said emulsion sufficient to fracture said formation and to displace at least a part of said emulsion into passages formed in the formation, allowing said emulsion to contact said passages for a time sufficient for at least a portion of the acid to react with the calcareous formation and the emulsion to be broken, and producing said well to remove liquids therefrom.

16. A process of treating a well to increase the productivity of a calcareous formation penetrated by the well, which process comprises dispersing finely divided Batu gum in an oily vehicle in an amount sufficient to effect emulsification of a strong acid in said vehicle, emulsifying in said Batu gum-containing vehicle a strong acid capable of reacting with calcareous formations to form a water-soluble salt, said Batu gum-containing vehicle and said acid being mixed in amounts and for the period of time required to obtain initially an emulsion having a viscosity in the range of about 25 to 50 poises, said emulsion being capable of becoming broken by contact with said calcareous formation, disposing said viscous emulsion in a confined zone in said well adjacent said calcareous formation, applying a pressure to said emulsion sufficient to fracture said formation and to displace at least a part of said emulsion into passages formed by said fracture whereby the acid component of said emulsion reacts with calcareous material to form a water-soluble salt and said emulsion is broken, and producing said well to remove fluids therefrom including liquid containing said water-soluble salt.

17. The process of claim 16 wherein the particle size of the finely divided Batu gum is smaller than 40 mesh, the oily vehicle is a hydrocarbon liquid, the amount of said oily vehicle is within the range of about 6 to about 24 parts by weight per hundred parts by weight of acid, and the amount of Batu gum is in the range of about 5 to about 30 parts by weight based on the amount of oily vehicle.

18. The process of claim 17 wherein the acid is hydrochloric acid having a concentration in the range of about 5° to about 20° Bé.

19. The process of claim 17 wherein said oily vehicle and said acid are homogenized to obtain said emulsion having a viscosity in the range of about 25 to 50 poises.

20. The process of claim 17 which includes the step of following said viscous emulsion in said confined zone with plain acid to displace unemulsified acid in addition to said emulsion into passages formed by said fracture.

References Cited in the file of this patent

UNITED STATES PATENTS

| Number | Name | Date |
|---|---|---|
| 1,922,154 | De Groote | Aug. 15, 1933 |
| 2,038,720 | De Groote | Apr. 28, 1936 |
| 2,050,932 | De Groote | Aug. 11, 1936 |
| 2,050,933 | De Groote | Aug. 11, 1936 |
| 2,124,530 | Loomis et al. | July 26, 1938 |
| 2,354,570 | Benckenstein | July 25, 1944 |
| 2,547,778 | Reistle, Jr. | Apr. 3, 1951 |

OTHER REFERENCES

"Hydrafrac Process," by J. B. Clark, The Oil and Gas Journal, October 14, 1948, pages 76–79.